Oct. 3, 1950 — B. J. HOWARD — 2,524,126
STRUCTURAL HOOP FOR SILOS AND THE LIKE
Filed April 4, 1947
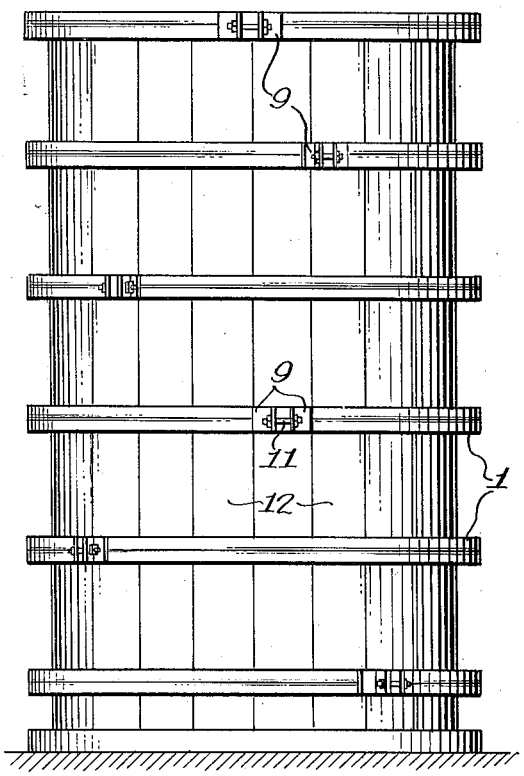
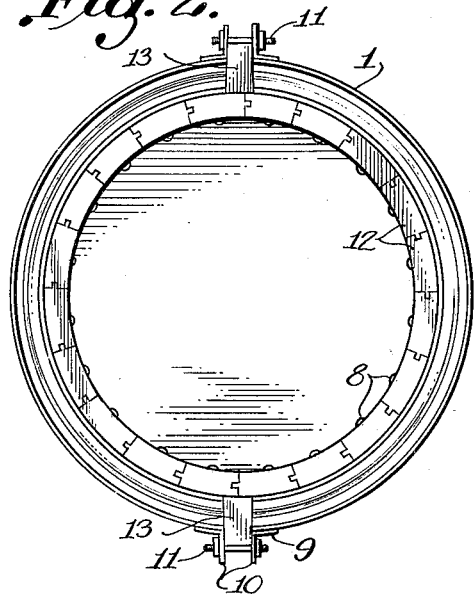
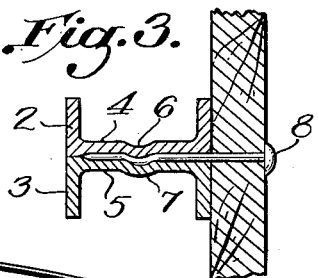
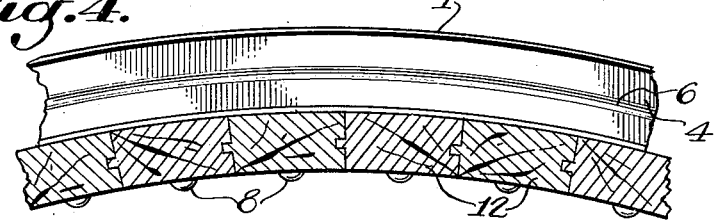
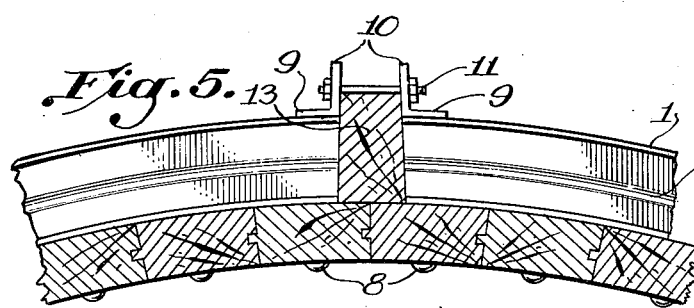
Inventor:
BRYAN J. HOWARD.
By Florian G. Miller
Attorney.

Patented Oct. 3, 1950

2,524,126

UNITED STATES PATENT OFFICE 2,524,126

STRUCTURAL HOOP FOR SILOS
AND THE LIKE

Bryan J. Howard, Venango Township,
Erie County, Pa.

Application April 4, 1947, Serial No. 739,425

2 Claims. (Cl. 20—1.4)

This invention relates generally to structural supports for vertically extending cylindrical structures and it relates more particularly to adjustable structural hoops for cylindrical structures made of wood such as silos, water tanks, and the like.

Hoops heretofore used on silos and like cylindrical wooden structures are generally cylindrical in cross section and only provide support of the wooden structure against direct outward movement or bursting. These hoops do not give a silo support against tilting, thereby requiring guy wires midway of the structure and on the top of the structure to maintain the silo in a vertical position. Even though guy ropes are used, the wooden structure moves out of shape in high winds. Warping of green lumber in a silo or like structure at present places the silo entirely out of shape and large openings and cracks result between the vertically extending wood strips. Warping of green lumber in these structures also causes misalignment of the silo, and it moves to a tilted position, thereby making it a dangerous structure. Furthermore, prior hoops gave no support against inward movement of the wooden sides nor did they give any support against lateral movement of the wooden sides. It has heretofore been necessary to build a ladder on the side of the silo to get to the top thereof.

It is, accordingly, an object of my invention to provide a novel structural hoop member for a silo or like cylindrical structure made of wood and it is more particularly an object of my invention to provide a structural hoop member for a silo or similar wooden structure which is simple in construction, economical in cost, easy to install, and economical in manufacture.

Another object of my invention is to provide a structural hoop member for wooden silos and like cylindrical structures which require no guy ropes or other outside bracing members to maintain the silo or like structure in a vertical position.

Another object of my invention is to provide a novel structural hoop member for a silo into which nails may be driven.

Another object of my invention is to provide structural hoop members for wooden silos or like cylindrical structures which are adjustable circumferentially of the silo.

Other objects of my invention will become evident from the following detailed description, taken in conjunction with the accompanying drawings, in which:

Fig. 1 is a side elevational view of a wooden silo with my novel structural hoop members disposed thereround;

Fig. 2 is a plan view of the silo shown in Fig. 1;

Fig. 3 is a vertical sectional view of my structural hoop member;

Fig. 4 is an enlarged fragmentary plan view of my novel structural hoop member showing tongue and groove sheeting nailed thereto; and Fig. 5 is an enlarged fragmentary plan view showing the means for connecting the ends of my novel structural hoop member.

Referring now to the drawings, Figs. 1, 2, 3, 4, and 5, show semi-circular shaped structural hoop members 1 having a cross section as shown in Fig. 3. The hoop member 1 comprises U-shaped or channel members 2 and 3 disposed back to back as shown in Fig. 3 forming an I-shaped structural member. The central portion of the web 4 of U-shaped member 2 is struck outwardly at 6 and the web portion 5 of U-shaped member 3 is struck inwardly at 7 a corresponding amount so that when the web portions 4 and 5 of U-shaped members 2 and 3 are disposed in juxtaposed position the struck out portion 6 nests in the struck out portion 7. The web portions 4 and 5 of members 2 and 3 are spot welded together by spot welds about every 6 inches along the circumference so that the U-shaped mmebers 2 and 3 may be separated by nails 8 except at the welded joints around the circumference thereof. The members 2 and 3 are bent in semi-circular shape and have angle members 9 welded to the outer sides of the ends thereof. The outer flanged portions 10 of the angle members 9 have apertures for receiving nut and bolt assemblies 11.

In building a wooden silo or other cylindrical wooden member, tongue and groove sheeting 12, as shown in Fig. 4, are preferably utilized. The sheeting 12 are nailed individually around the circumference of the members 1 as shown particularly in Figs. 3 and 4, the nails 8 having the ends thereof crimped between members 2 and 3 to secure the sheeting 12. After the sheeting are nailed to the semi-circular structural members 1, the members 1 are bolted together by the bolt and nut assemblies 11 and firmly secured together. Wedge members 13 are disposed in the space between the ends of members 1, the tapered sides of the wedge members 13 engaging the outer side of the vertically extending wooden members 12 adjacent the ends of the hoop members 1 and the bolts of the bolt and nut assemblies 11 to provide support for the sheeting 12 at the point of junction between the ends of the member 1. The members 1 are preferably staggered as shown in Fig. 1 to provide better support and so that the adjusting bolt and nut assemblies 11 will not force the members 1 together at one point along the side of the silo.

It will thus be seen from the foregoing that I have provided novel means for building a silo or other wooden cylindrical structure which requires no other structural support to maintain a vertical position, which simplifies the building of the structure, and which provides support for the vertical wooden structure inwardly, outwardly and laterally.

My structural hoop members also provide a convenient ladder means on the side of a silo without the necessity of building a separate ladder.

Various changes may be made in the specific embodiment of my invention without departing from the spirit thereof or from the scope of the appended claims.

What I claim is:

1. A wooden cylindrical structure comprising circularly disposed, vertically extending conventional tongue and groove wooden members, complementary semi-circular shaped structural hoop members disposed around said wooden members, the cross section of which comprises two U-shaped members disposed back to back and secured together at intervals and having the webs thereof irregular in form, nails extending from the inside of said wooden cylindrical structure through said wooden members into said structural hoop member between said U-shaped members, apertured opposed angle members secured to the ends of said semi-circular shaped hoop members, and bolt and nut assemblies disposed in the apertures of opposing angle members to draw the ends of said semi-circular shaped members together.

2. A wooden cylindrical structure as set forth in claim 1 wherein a wedge member is disposed between said bolts and the outer surface of said wooden members to support said wooden members adjacent the ends of said hoop members against bursting outwardly.

BRYAN J. HOWARD.

REFERENCES CITED

The following references are of record in the file of this patent:

UNITED STATES PATENTS

| Number | Name | Date |
| --- | --- | --- |
| 1,135,143 | Smith | Apr. 13, 1915 |
| 1,900,541 | Buelow et al. | Mar. 7, 1933 |
| 2,127,435 | Snow et al. | Aug. 16, 1938 |

FOREIGN PATENTS

| Number | Country | Date |
| --- | --- | --- |
| 304,132 | Italy | Dec. 28, 1932 |

OTHER REFERENCES

Printed Publication: "Qualified to Serve" (Stran-Steel) published in 1943 by the Great Lakes Steel Corp.